UNITED STATES PATENT OFFICE.

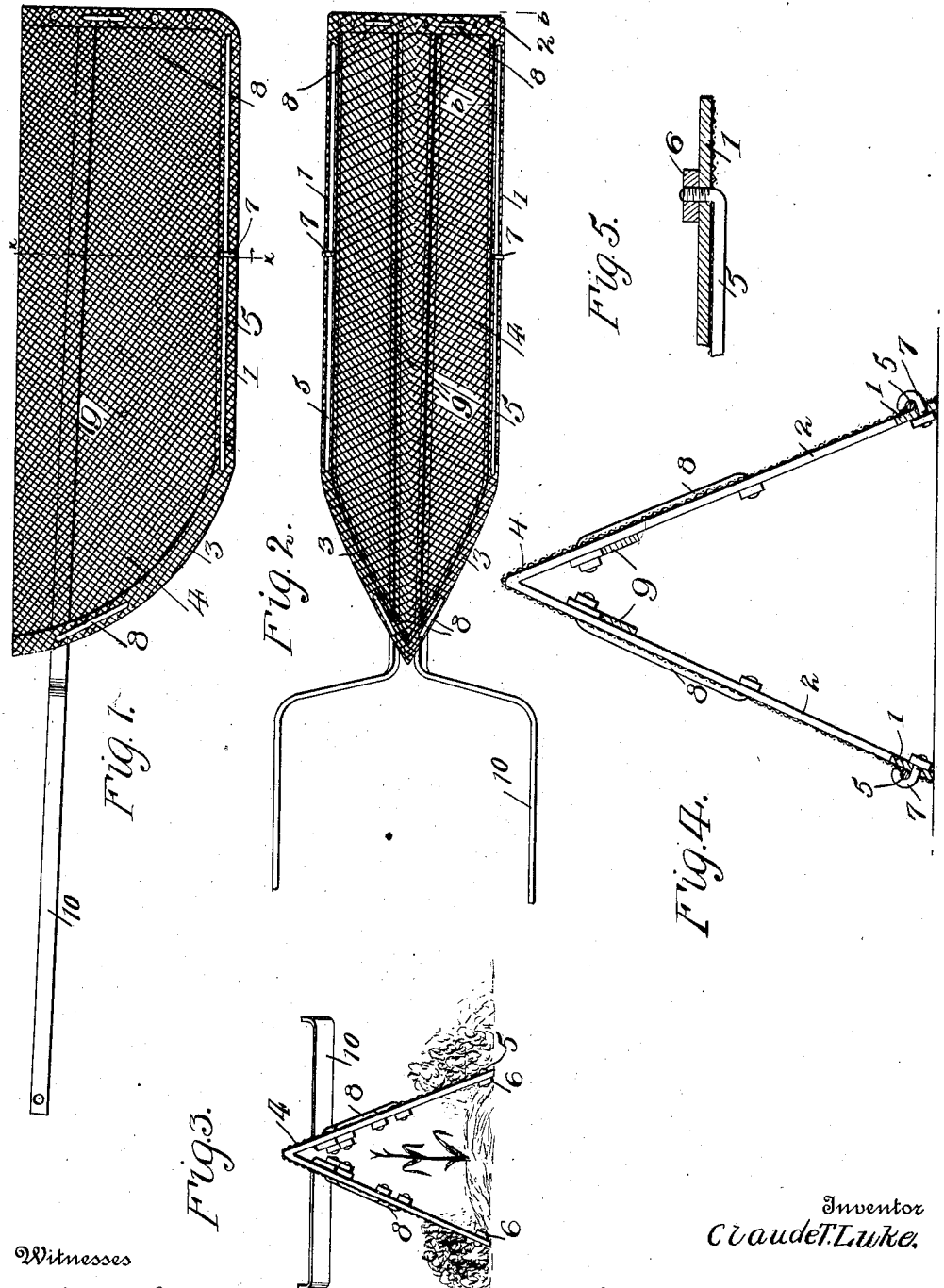

CLAUDE T. LUKE, OF CLARK, OHIO.

CULTIVATOR-FENDER.

1,003,365.

Specification of Letters Patent.   Patented Sept. 12, 1911.

Application filed September 7, 1910.   Serial No. 580,837.

*To all whom it may concern:*

Be it known that I, CLAUDE T. LUKE, a citizen of the United States, residing at Clark, in the county of Coshocton and State of Ohio, have invented new and useful Improvements in Cultivator-Fenders, of which the following is a specification.

This invention provides a fender adapted most especially for use in connection with cultivators to prevent clods and lumps of earth from falling upon the plants when cultivating the same.

The invention contemplates a fender which will permit of fine earth passing through the members of the fender so as to cover the roots of the plants while at the same time warding off clods and preventing their falling upon and covering the plants so as to injure their growth.

The invention consists of a fender of novel formation, which hereinafter will be more particularly set forth, illustrated in the accompanying drawing and more particularly pointed out in the appended claim.

In the drawing, forming a part of the application, Figure 1 is a side view of a fender embodying the invention. Fig. 2 is a top plan view of the fender. Fig. 3 is a rear view. Fig. 4 is a sectional view on the line $x$—$x$ of Fig. 1. Fig. 5 is a horizontal section on the line $b$—$b$ of Fig. 2, showing the parts on a larger scale.

Corresponding and like parts are referred to in the following description, and indicated in all the views of the drawing, by the same reference characters.

The fender embodies a frame formed of similar side pieces, which are upwardly converged, each side piece consisting of a longitudinal bar 1, a rear upright 2, and a front upright 3, the latter curving upwardly and forwardly. The longitudinal bars 1 constitute in effect runners and the front uprights 3 form curved ends which enable the runners to pass over clods and other obstructions. The rear uprights 2 are of integral formation and form an inverted V-shaped connection for the rear ends of the longitudinal bars 1. The front uprights 3 are likewise of integral formation and serve to connect the forward portions of the longitudinal bars 1. The several parts of the frame are of substantial construction so as to withstand hard usage and wear. The frame is covered by wire screen 4 of suitable mesh to enable fine earth to pass therethrough, but to ward off clods and prevent their falling upon the plants. The wire screen 4 is bent over the outside of the frame of the fender and is secured to the outer side of the bars 1 and uprights 2 and 3. Binding rods 5 extend along the outer sides of the longitudinal bars 1 and serve to confine the lower edges of the wire screen 4 thereto, the end portions of the binding rods being bent and passing through openings formed in end portions of the longitudinal bars and having the bent ends threaded to receive nuts 6. Hook bolts 7 engage the binding rods 5 at a middle point and pass through openings formed in the longitudinal bars 1 and serve to secure the binding rods 5 at intermediate points in their length. Clips 8 connect the end portions of the wire screen to the uprights.

Draft bars 9 extend along the inner sides of the members comprising the fender and are secured to the front and rear uprights of the main frame and their front ends project and are spread, as indicated at 9, to make connection with the beams of the cultivator or other implement with which the fender is to be used. The projecting portions 10 of the draft bars are offset immediately in advance of the fender, thereby enabling the projecting parts 10 to extend in parallel lines so as to come close against the sides of the beams or toothed bars of the cultivator. The rear ends of the draft bars are adjustably connected with the rear uprights 2, thereby enabling the relative inclination of the draft bars to be changed to suit the particular nature of work in hand. The rear uprights 2 have a series of openings which are adapted to receive the clips 8 by means of which the rear ends of the draft bars 9 are adjustably connected therewith.

The main frame of the fender may be constructed in any manner, but it is preferred to form the same of steel bars comparatively thin and wide and to have the frame of considerable length to prevent the clods falling inward in the rear of the fender and covering the plants.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A cultivator fender comprising a frame formed of similar side members, each of the members comprising a longitudinal bar and front and rear uprights, said uprights constituting V-shaped connections for joining the ends of the longitudinal bars, a wire screen covering the side members of the frame, binding rods confining the edges of the wire screen to the longitudinal bars and having their end portions bent and threaded and passing through openings in end portions of the longitudinal bars and receiving nuts, intermediate connections securing the binding rods to the longitudinal bars, draft bars extending along the inner sides of the members and having their front ends projecting, means pivotally connecting the draft bars to the front uprights, and other means adjustably connecting the rear ends of the draft bars to the rear portions of said side members, the projecting ends of the draft bars being offset to spread their forward portions.

In testimony whereof I affix my signature in presence of two witnesses.

CLAUDE T. LUKE.

Witnesses:
CLIFF KASER,
K. K. KASER.

---

Copies of this patent may be obtained for five cents each, by addressing the "Commissioner of Patents, Washington, D. C."